(12) United States Patent
Tang et al.

(10) Patent No.: US 10,868,463 B2
(45) Date of Patent: Dec. 15, 2020

(54) VIBRATION MOTOR AND MOBILE COMMUNICATION DEVICE USING SAME

(71) Applicant: AAC ACOUSTIC TECHNOLOGIES (SHENZHEN) CO., LTD., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/527,018

(22) Filed: Jul. 31, 2019

(65) Prior Publication Data

US 2020/0044528 A1 Feb. 6, 2020

(30) Foreign Application Priority Data

Aug. 3, 2018 (CN) ..................... 2018 2 1255397 U

(51) Int. Cl.
*H02K 33/08* (2006.01)
*H02K 33/16* (2006.01)
*H04M 1/02* (2006.01)

(52) U.S. Cl.
CPC ............ *H02K 33/08* (2013.01); *H04M 1/026* (2013.01)

(58) Field of Classification Search
CPC ........ H02K 33/08; H02K 33/16; H04M 1/026
See application file for complete search history.

(56) References Cited

U.S. PATENT DOCUMENTS

| 2017/0033657 | A1* | 2/2017 | Mao | H02K 33/16 |
| 2017/0033663 | A1* | 2/2017 | Wang | H02K 33/00 |
| 2017/0033670 | A1* | 2/2017 | Xu | H02K 33/16 |
| 2018/0205139 | A1* | 7/2018 | Lin | H01Q 1/246 |
| 2018/0229070 | A1* | 8/2018 | McBride | A63B 21/4001 |
| 2019/0165662 | A1* | 5/2019 | Endo | B06B 1/045 |
| 2019/0326787 | A1* | 10/2019 | Kondo | G01V 3/10 |

OTHER PUBLICATIONS

IFixIt, "iPhone 6s Plus Teardown" Sep. 25, 2015, https://www.ifixit.com/Teardown/iPhone+6s+Plus+Teardown/48171.*
Christian Zibreg, "Apple's New Taptic Engine Inside iPhone 6s Blasted with X-Rays, Captured in Action on Video" Sep. 25, 2015, https://www.idownloadblog.com/2015/09/25/video-iphone-6s-taptic-engine.*

* cited by examiner

*Primary Examiner* — George Eng
*Assistant Examiner* — Hung K Du
(74) *Attorney, Agent, or Firm* — W&G Law Group LLP

(57) ABSTRACT

The present disclosure provides a vibration motor and a mobile communication device using same. The vibration motor includes an housing, a vibrator accommodated in the housing, a driving apparatus driving the vibrator to vibrate, and an elastic part elastically supporting the vibrator, where the driving apparatus is a secondary coil accommodated in the housing, the vibrator is provided with a magnet steel corresponding to the coil, the vibration motor further includes a primary coil, disposed outside the housing, corresponding to the secondary coil, and spaced apart from the secondary coil, and the primary coil is electrically connected to the outside to generate an alternating electromagnetic field, to cause the secondary coil to generate an induced electromotive force, and cause relative vibration between the vibrator and the secondary coil.

12 Claims, 4 Drawing Sheets

VIBRATION MOTOR AND MOBILE COMMUNICATION DEVICE USING SAME

TECHNICAL FIELD

The present disclosure relates to the field of vibration motors, and in particular, to a vibration motor and a mobile communication device using same.

BACKGROUND

With the development of electronic technologies, portable consumer electronic products become more popular with people. The portable consumer electronic products, such as mobile phones, handheld game consoles, navigation apparatuses, and handheld multimedia entertainment devices generally use a vibration motor in system feedback, for example, in an incoming call prompt of a mobile phone, an information prompt, a navigation prompt, and vibration feedback of a game console. Such a wide range of application requires high performance of the vibration motor and a long service life.

A vibration motor generally includes a housing having an accommodation space, a vibrator accommodated in the accommodation space, an elastic part elastically supporting the vibrator, and a flexible printed circuit disposed in the housing and used for electrical connection. After applied to a mobile communication device, the vibration motor is electrically connected to the circuit board in the mobile communication device by using a conducting wire. However, wiring of the electrical connection in this type is inconvenient, has a complex structure, and occupies a relatively large space, and it is difficult to meet the requirement.

Therefore, a new vibration motor needs to be provided to resolve the foregoing problems.

DETAILED DESCRIPTION

The present disclosure is further described below with reference to the accompanying drawings.

Figure 1:
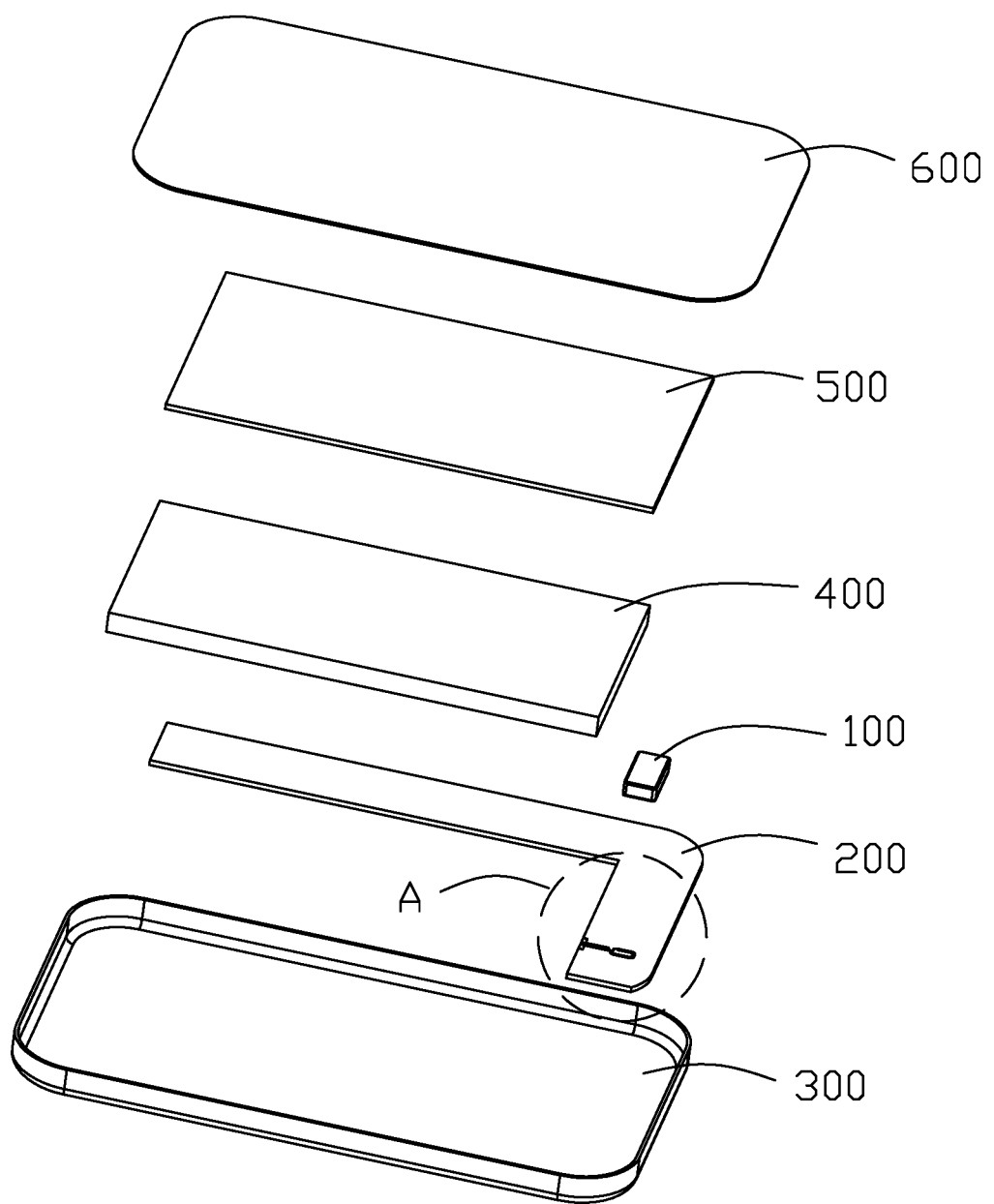
FIG. 1 is an exploded schematic structural diagram of a mobile communication device according to the present disclosure.
Figure 2:
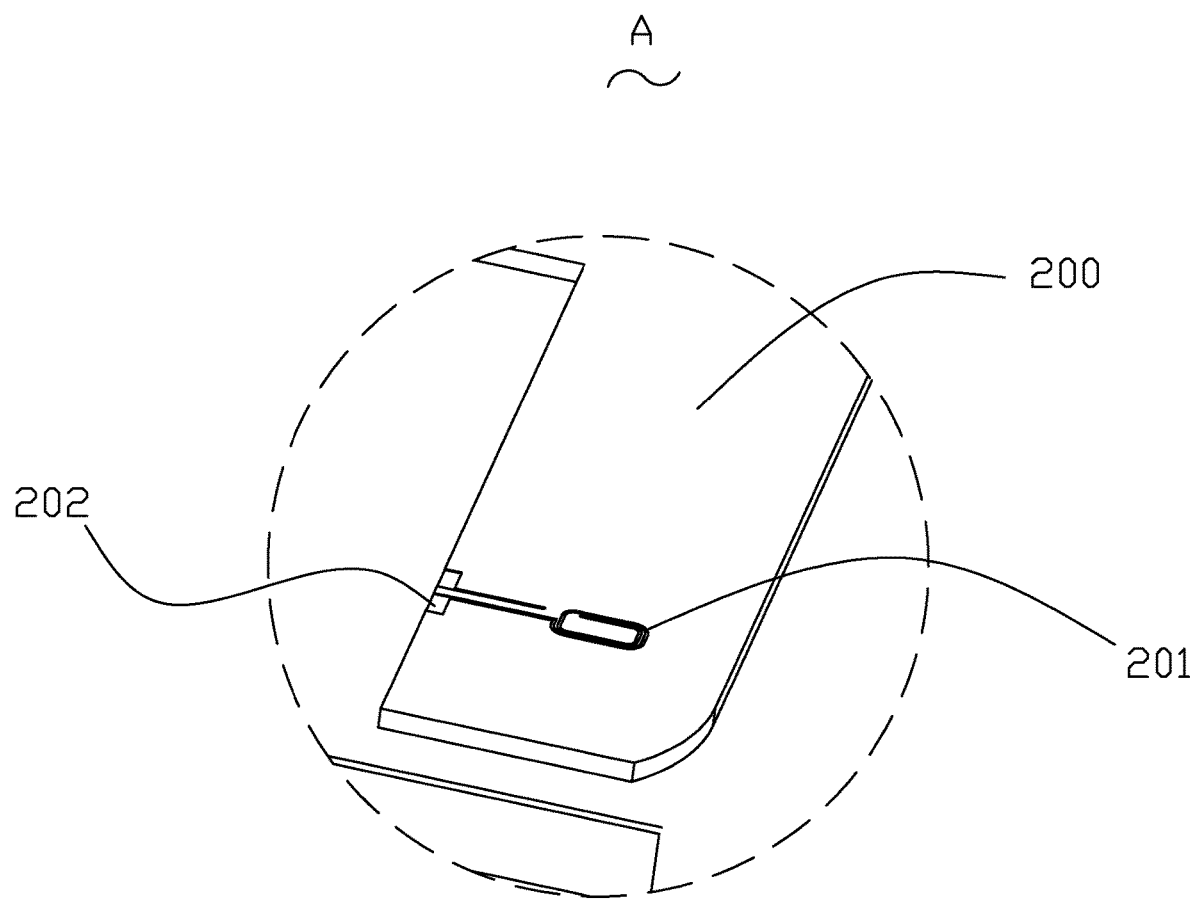
FIG. 2 is an enlarged diagram of a part A shown in FIG. 1.

As shown in FIG. 1 and FIG. 2, the present disclosure provides a mobile communication device, including a shell 300, a mainboard 400, a vibration motor 100, and a screen.

The screen includes a display 500 and a glass screen 600 attached to the display 500, the screen covers the shell 300 and defines an accommodation space with the shell 300.

The mainboard 400 is provided with a control module, a function module and a circuit board 200. The vibration motor 100 and the circuit board 200 are disposed opposite each other.

Figure 3:
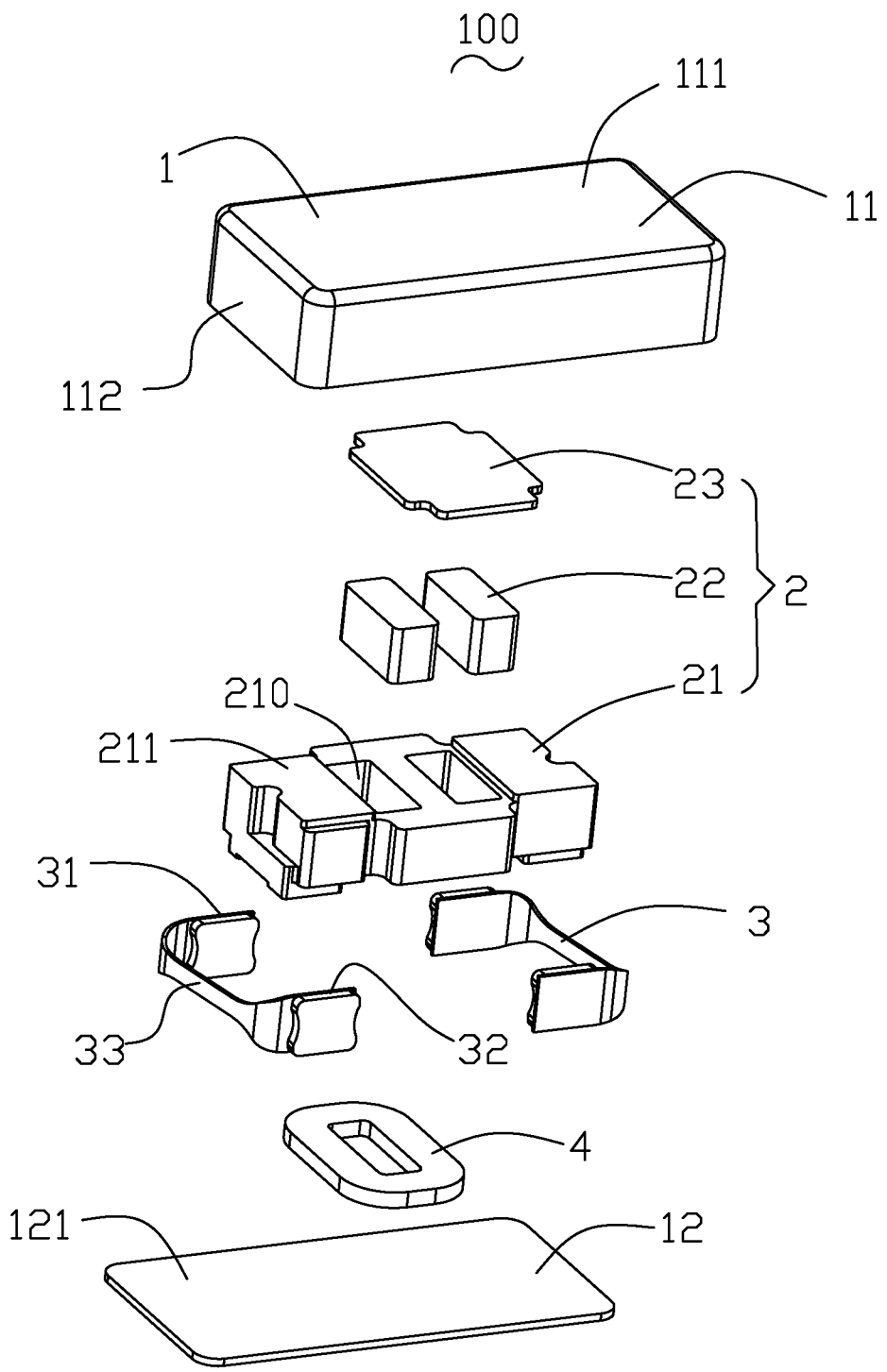
FIG. 3 is an assembled schematic structural diagram of a vibration motor and a flexible printed circuit according to the present disclosure.

As shown in FIG. 2 and FIG. 3, the circuit board 200 is provided with a primary coil 201 and a signal input end 202 connected to the primary coil 201. The signal input end 202 is configured to be connected to the control module or the function module of the mobile communication device, so as to input a signal.

Figure 4:
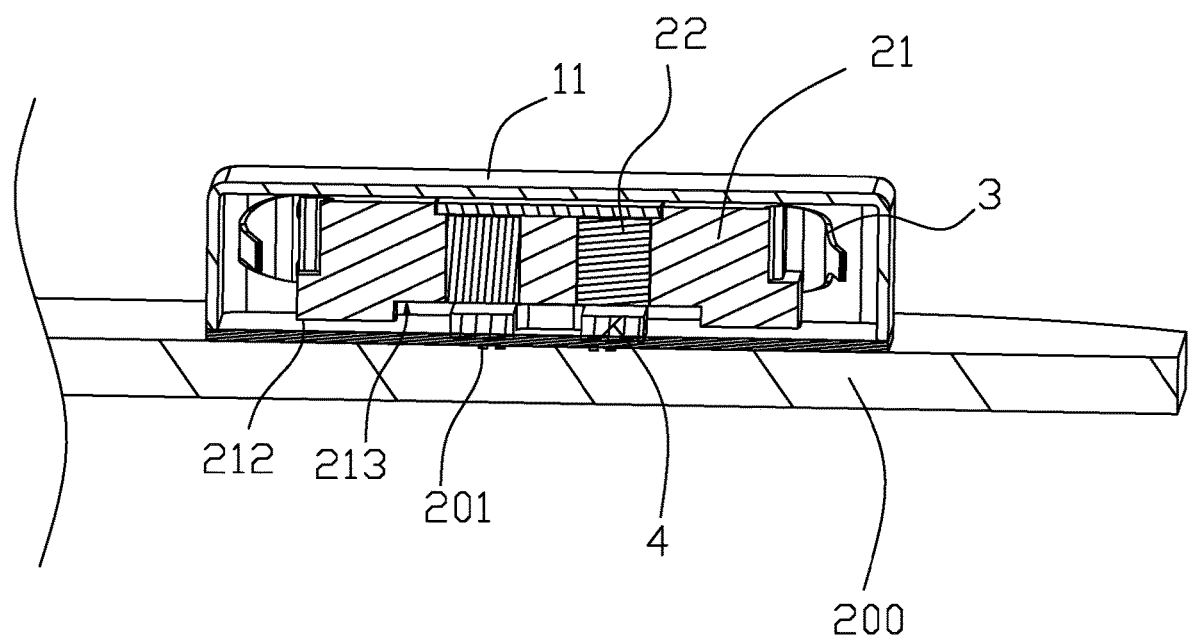
FIG. 4 is an exploded schematic structural diagram of a vibration motor according to the present disclosure.

As shown in FIG. 4, the vibration motor 100 provided by the present disclosure includes a housing 1, a vibrator 2 accommodated in the housing 1, an elastic part 3 elastically supporting the vibrator 2, and a driving apparatus driving the vibrator 2 to vibrate along a vibration direction.

The housing 1 has an elongated structure, including a top wall 111, a bottom wall 121 disposed opposite the top wall, and a side wall 112 connecting the top wall 111 and the bottom wall 121. Specifically, in this embodiment, the housing 1 includes a cover 11 including the top wall 111 and the side wall 112 and a base plate 12 covering the cover 11, used as the bottom wall 121, and defining an accommodation space with the cover 11. The housing 1 is a plastic housing.

The driving apparatus is a secondary coil 4 fixed on the bottom wall 121 of the housing 1. The bottom plate 12 is made of a non-magnetic conductive material. The bottom plate 12 of the vibration motor 100 is disposed opposite the circuit board 200. Specifically, the secondary coil 4 is disposed opposite and spaced from the primary coil 201 on the circuit board 200.

One end of the elastic part 3 is connected with the vibrator 2, and the other end of the elastic part 3 is connected to the side wall 112 of the housing 1.

The vibrator 2 includes magnet steels 22 corresponding to the secondary coil 4. The primary coil 201 is electrically connected to the outside through the signal input terminal 202 and generates an alternating magnetic field, so that the secondary coil 4 generates an induced electromotive force to generate an alternating magnetic field, and a Lorentz force driving the vibrator to vibrate along a direction parallel to the bottom wall 121 is generated between the magnet steels 22 of the vibrator 2, so as to cause a relative motion between the vibrator and the secondary coil 4. Due to mutual induction between the primary coil 201 and the secondary coil 4, there is no need to provide conducting wires or circuit boards in the housing, which simplifies a product structure and avoids a product reliability problem resulted from winding of conducting wires in a conventional structure.

The vibrator 2 includes a counterweight block 21 and a magnet steel 22 disposed on the counterweight block 21. Specifically, in this embodiment, the counterweight block 21 includes an upper surface 211 corresponding to the top wall 111, a lower surface 212 corresponding to the bottom wall 121, and a through hole 210 running through the upper surface 211 and the lower surface and defined by an inner wall, and the magnet steel 22 is disposed in the through hole 210. The lower surface 212 includes a concave slot 213 communicating with the through hole 210 to avoid the secondary coil 4. In this embodiment, there are two through holes 210, disposed on the counterweight block 21 spaced from each other; and there are two magnet steels 22, separately disposed in the two through holes 210.

The elastic part 3 is two C-type springs disposed with opening directions being opposite each other. Specifically, the elastic part 3 includes a first fixed portion 31 connected to the counterweight block 21 of the vibrator 2, a second fixed portion 32 connected to the side wall 112, and a connecting portion 33 connecting the first fixed portion 31 and the second fixed portion 32.

A vibration motor in the present disclosure includes a housing, a vibrator accommodated in the housing, a driving apparatus driving the vibrator to vibrate, and an elastic part elastically supporting the vibrator. The driving apparatus is a secondary coil accommodated in the housing, the vibrator is provided with a magnet steel corresponding to the coil, the vibration motor further includes a primary coil disposed outside the housing and corresponding to the secondary coil, and the primary coil is electrically connected to the outside to generate an alternating electromagnetic field, to cause the secondary coil to generate an induced electromotive force, and cause the vibrator and the secondary coil to generate a Lorentz force that drives the vibrator to vibrate. A new electrical connection manner is used, and a circuit or a cable does not need to be disposed in the housing of the vibration motor, so that a structure can be simplified, a space can be saved, and reliability problems such as winding and breaking caused due to complex cabling are avoided, thereby effectively improving the product reliability performance.

Although the embodiments of the present disclosure are shown and described above, it can be understood that the embodiments are exemplary and cannot be construed as limitations to the present disclosure, and a person of ordinary skill in the art can make changes, modifications, replacement, and variations to the embodiments within the scope of the present disclosure.

What is claimed is:

1. A vibration motor, comprising a housing, a vibrator accommodated in the housing, a driving apparatus driving the vibrator to vibrate, and an elastic part elastically supporting the vibrator;
    wherein the driving apparatus is a secondary coil accommodated in the housing, the vibrator is provided with a magnet steel corresponding to the coil;
    the vibration motor further comprises a primary coil, disposed outside the housing, corresponding to the secondary coil, and spaced from the secondary coil; and the primary coil generates an alternating electromagnetic field, to cause the secondary coil to generate an induced electromotive force, and cause relative vibration between the vibrator and the secondary coil; wherein
    the vibrator comprises a counterweight block, and a magnet steel corresponding to the secondary coil and disposed on the counterweight block, with a through hole running through the counterweight to receive the magnet steel, the counterweight block comprising a lower surface corresponding to the secondary coil;
    wherein the housing comprises a top wall, a bottom wall disposed opposite to the top wall, and a side wall connecting the top wall and the bottom wall; the secondary coil is disposed on the bottom wall;
    wherein the elastic part comprises two C-type springs respectively disposed at two sides of the vibrator, and each C-type spring comprises a first fixed portion connected to the vibrator, a second fixed portion connected to the side wall, and a connecting portion connecting the first fixed portion and the second fixed portion;
    wherein the first fixed portion and the second fixed portion are disposed on two opposite sides of the counterweight block.

2. The vibration motor according to claim 1, wherein the counterweight block comprises an upper surface corresponding to the top wall, the lower surface corresponding to the bottom wall, and the through hole running through the upper surface and the lower surface, and the magnet steel is disposed in the through hole.

3. The vibration motor according to claim 2, wherein there are two through holes, and the two through holes are parallel and spaced from each other, and each through hole is disposed with one magnet steel.

4. The vibration motor according to claim 2, wherein the housing is a plastic housing.

5. The vibration motor according to claim 3, wherein the housing is a plastic housing.

6. The vibration motor according to claim 1, wherein the housing is a plastic housing.

7. A mobile communication device, comprising a circuit board and a vibration motor, wherein the vibration motor comprises a housing, a vibrator accommodated in the housing, a driving apparatus driving the vibrator to vibrate, and an elastic part elastically supporting the vibrator;
    wherein the driving apparatus is a secondary coil accommodated in the housing, the vibrator is provided with a magnet steel corresponding to the coil;
    the vibration motor further comprises a primary coil, disposed outside the housing, corresponding to the secondary coil, and spaced from the secondary coil; and the primary coil generates an alternating electromagnetic field, to cause the secondary coil to generate an induced electromotive force, and cause relative vibration between the vibrator and the secondary coil;
    wherein the primary coil is disposed on the circuit board; the vibrator comprises a counterweight block, and a magnet steel corresponding to the secondary coil and disposed on the counterweight block, with a through hole running through the counterweight to receive the magnet steel, the counterweight block comprising a lower surface corresponding to the circuit board;
    wherein the housing comprises a top wall, a bottom wall disposed opposite to the top wall, and a side wall connecting the top wall and the bottom wall; the secondary coil is disposed on the bottom wall;
    wherein the elastic part comprises two C-type springs respectively disposed at two sides of the vibrator, and each C-type spring comprises a first fixed portion connected to the vibrator, a second fixed portion connected to the second fixed portion;
    wherein the first fixed portion and the second fixed portion are disposed on two opposite sides of the counterweight block.

8. The mobile communication device according to claim 7, wherein the counterweight block comprises an upper surface corresponding to the top wall, the lower surface corresponding to the bottom wall, and the through hole running through the upper surface and the lower surface, and the magnet steel is disposed in the through hole.

9. The mobile communication device according to claim 8, wherein there are two through holes, and the two through holes are parallel and spaced from each other, and each through hole is disposed with one magnet steel.

10. The mobile communication device according to claim 7, wherein the housing is a plastic housing.

11. The mobile communication device according to claim 7, wherein the mobile communication device further comprises a shell having an accommodation space, a mainboard accommodated in the shell, and a screen covering the shell, wherein the circuit board is disposed on the mainboard.

12. The mobile communication device according to claim 11, wherein the screen comprises a display screen and a glass screen attached to the display screen.

* * * * *